United States Patent
Papulov

(10) Patent No.: US 7,162,226 B2
(45) Date of Patent: Jan. 9, 2007

(54) METHOD AND SYSTEM OF ADVERTISING IN A MOBILE COMMUNICATION SYSTEM

(75) Inventor: Michael V. Papulov, Moskow (RU)

(73) Assignee: Global Direct Management Corp., Brooklyn, NY (US)

( * ) Notice: Subject to any disclaimer, the term of this patent is extended or adjusted under 35 U.S.C. 154(b) by 236 days.

(21) Appl. No.: 10/851,524

(22) Filed: May 21, 2004

(65) Prior Publication Data

US 2005/0227679 A1 Oct. 13, 2005

Related U.S. Application Data

(60) Provisional application No. 60/566,522, filed on Apr. 28, 2004, provisional application No. 60/562,088, filed on Apr. 13, 2004.

(51) Int. Cl.
*H04Q 7/20* (2006.01)

(52) U.S. Cl. .................. 455/414.3; 455/414.1; 455/90.1

(58) Field of Classification Search ............ 455/414.3, 455/414.1, 90.1, 418–419, 420, 412.1, 412.2
See application file for complete search history.

(56) References Cited

U.S. PATENT DOCUMENTS

| | | | | |
|---|---|---|---|---|
| 5,852,775 | A * | 12/1998 | Hidary | 455/412.1 |
| 6,011,976 | A | 1/2000 | Michaels et al. | |
| 6,453,167 | B1 | 9/2002 | Michaels et al. | |
| 6,622,174 | B1 | 9/2003 | Ukita et al. | |
| 6,665,533 | B1 | 12/2003 | Sakoda | |
| 6,725,022 | B1 * | 4/2004 | Clayton et al. | 455/154.1 |
| 6,862,445 | B1 * | 3/2005 | Cohen | 455/412.1 |
| 7,027,802 | B1 | 4/2006 | Kim | |
| 2001/0027414 | A1 | 10/2001 | Azuma et al. | |
| 2003/0037028 | A1 | 2/2003 | Akhteruzzaman et al. | |
| 2003/0050837 | A1 | 3/2003 | Kim | |
| 2003/0092387 | A1 | 5/2003 | Hjelmvik | |
| 2003/0149626 | A1 | 8/2003 | Bach | |
| 2003/0163359 | A1 | 8/2003 | Kanesaka | |
| 2003/0177198 | A1 | 9/2003 | Yabe et al. | |
| 2004/0005874 | A1 | 1/2004 | Malackowski et al. | |
| 2004/0224705 | A1 | 11/2004 | Nishimura | |

(Continued)

FOREIGN PATENT DOCUMENTS

DE  10061984  6/2002

(Continued)

*Primary Examiner*—CongVan Tran
(74) *Attorney, Agent, or Firm*—Gary J. Gershik; Cooper & Dunham LLP

(57) ABSTRACT

A method for advertising in a mobile communication system may include generating a request for advertisement information, transmitting the request for advertisement information to an advertisement device, wherein the advertisement device stores a plurality of advertisement information, receiving requested advertisement information from the advertisement device, storing the requested advertisement information in a storage device and presenting selected advertisement information along with notification information indicating an incoming request for connection to a user of a mobile communication device when a request for connection is received by the mobile communication device. The presented selected advertisement information may be stored and statistic information relates to the selected advertisement information may be generated and sent to the advertisement device. The statistic information may be utilized to offset the cost of using the mobile communication system for the user or to track use of the system. The advertisement information may be requested, provides, received and stored during a stand by mode of the mobile communication device. The advertisement information may be request, provided received and stored during a non-peak time on a provider network used by the mobile communication device.

21 Claims, 17 Drawing Sheets

U.S. PATENT DOCUMENTS

| | | | |
|---|---|---|---|
| 2004/0266406 A1* | 12/2004 | Meda | 455/414.1 |
| 2005/0215238 A1* | 9/2005 | Macaluso | 455/414.1 |

FOREIGN PATENT DOCUMENTS

| | | |
|---|---|---|
| EP | 0986273 | 3/2000 |
| FR | 2810836 | 12/2001 |
| GB | 2 406 996 | 4/2006 |
| HU | 0200846 | 10/2003 |
| JP | 2002-033826 | 1/2002 |
| JP | 2002-063331 | 2/2002 |
| JP | 2002-140624 | 5/2002 |
| JP | 2002-170027 | 6/2002 |
| JP | 2002-314720 | 10/2002 |
| JP | 2003-271860 | 9/2003 |
| JP | 2003-289560 | 10/2003 |
| JP | 2003-296228 | 10/2003 |
| JP | 2003-317002 | 11/2003 |
| JP | 2004-021970 | 1/2004 |
| JP | 2004-166186 | 6/2004 |
| JP | 2004-336581 | 11/2004 |
| JP | 2005-110186 | 4/2005 |
| JP | 2005-159590 | 6/2005 |
| RU | 2126603 | 2/1999 |
| RU | 2136058 | 8/1999 |
| RU | 2192049 | 10/2002 |
| RU | 2208838 | 7/2003 |
| RU | 2210421 | 8/2003 |
| WO | WO 1997/041654 | 11/1997 |
| WO | WO 2002/001896 | 1/2002 |
| WO | WO 2005/096255 | 10/2005 |

* cited by examiner

METHOD AND SYSTEM OF ADVERTISING IN A MOBILE COMMUNICATION SYSTEM

REFERENCE TO RELATED APPLICATIONS

The present specification is based on Provisional Application 60/562,088 filed Apr. 13, 2004 and Provisional Application 60/566,522 filed Apr. 28, 2004, the entire contents of which are herein incorporated by reference.

FIELD OF DISCLOSURE

The present disclosure relates to advertising in mobile communication systems and more particularly to a method and system for advertising in mobile communication systems.

BACKGROUND OF THE DISCLOSURE

Mobile communication systems are increasingly becoming an integral part of every day life. For example, the number of users of cellular telephone systems has been steadily increasing for many years. As the mobile communication industry has grown, the technology in the industry has improved greatly. Mobile communication devices, such as cell phones, commonly include improved display devices capable of color display, the display of text data and more complex graphical information. In addition, the microprocessors in such devices have advanced such that they are capable of processing very large amounts of data, thus enabling the transmission and presentation of text data, complex graphics and audio data as well. Thus, mobile communication devices have become a useful medium for advertisers.

For example, U.S. Pat. No. 6,622,174 B1 relates to a system and method for sending, converting, and adding advertisements to electronic messages sent across a network. European Patent Publication EP0986173 A1 relates to the transmission of advertising messages via shortmessage service (SMS). Russian Patent Publication RU2192049 relates to a method for disseminating advertising and informative messages (variants). French Patent Publication FR2810836 relates to a remote message control system with a public terminal that can send selected publicity to user addresses. While these publications relate generally to advertising in a mobile communication system, they do not disclose the system and methods for advertising in a mobile communication system discussed herein.

Thus it is clear that it is desirable to provide a method and system for advertisement in a mobile communication system.

SUMMARY OF THE DISCLOSURE

A system for advertising in a mobile communication according to an embodiment of the present disclosure includes an advertisement device adapted to store a plurality of advertisement information and to provide requested advertisement information, a mobile communication device and a provider network adapted to provide communication between the advertisement device and the mobile communication device, wherein the mobile communication device further includes a requesting device adapted to generate a request for advertisement information, a transmission device adapted to send at least the request for advertisement information to the advertisement device, a receiving device adapted to receive at least the requested advertisement information provided by the advertisement device, a storage device adapted to store at least the requested advertisement information, an interface device adapted to present selected advertisement information from the requested advertisement information to a user of the mobile communication device when a request for connection to a second communication device is received by the mobile communication device along with notification information indicating the incoming request for connection and a notification device adapted to record the selected advertisement information presented to the user by the interface device.

A system for advertising in a mobile communication system according to another embodiment of the present disclosure includes an advertisement device adapted to store a plurality of advertisement information and to provide requested advertisement information, a mobile communication device, a provider network adapted to provide communication between the advertisement device and the mobile communication device, wherein the mobile communication device further includes a requesting device adapted to generate a request for advertisement information, a transmission device adapted to send at least the request for advertisement information to the advertisement device, a receiving device adapted to receive at least the requested advertisement information provided by the advertisement device, a storage device adapted to store at least the requested advertisement information, a connection request device adapted to provide a request for connection to a second communication device, wherein selected advertisement information from the requested advertisement information and the request for connection are transmitted to the second communication device, such that the selected advertisement information is presented to a user of the second mobile communication device with notification information indicating the incoming request for connection, and a notification device, positioned at the second communication device, adapted to record the selected advertisement information presented to the user of the second communication device.

A method of advertising in a mobile communication system according to one embodiment of the present disclosure includes generating a request for advertisement information at a mobile communication device, transmitting at least the request for advertisement information to an advertisement device, providing requested advertisement information from the advertisement device, receiving at least the requested advertisement information provided by the advertisement device, storing at least the requested advertisement information, presenting selected advertisement information from the requested advertisement information and notification information indicating an incoming request for connection to a user of the mobile communication device when the request for connection to a second communication device is received and recording the selected advertisement information presented to the user using a notification device.

A method for advertising in a mobile communication system according to another embodiment of the present disclosure includes generating a request for advertisement information at a mobile communication device, transmitting at least the request for advertisement information to an advertisement device, providing requested advertisement information from the advertisement device, receiving at least the requested advertisement information provided by the advertisement device, storing at least the requested advertisement information, generating a request for connection to a second communication device, transmitting the request for connection and selected advertisement information from the requested advertisement information to the second communication device such that the selected advertisement information and notification information indicating the request for connection are presented to a user of the second communication device when the request for connection is received and recording, at the second communication device, the selected advertisement information presented to the user.

A computer system according to an embodiment of the present disclosure includes a processor and a program storage device readable by the computer system, embodying a program of instructions executable by the processor to perform method steps for advertising in a mobile communication system. The method steps include generating a request for advertisement information at a mobile communication device, transmitting at least the request for advertisement information to an advertisement device, providing requested advertisement information from the advertisement device, receiving at least the requested advertisement information provided by the advertisement device, storing at least the requested advertisement information, presenting selected advertisement information from the requested advertisement information and notification information indicating an incoming request for connection to a user of the mobile communication device when the request for connection to a second communication device is received and recording the selected advertisement information presented to the user using a notification device.

A computer system according to an embodiment of the present disclosure includes a processor and a program storage device readable by the computer system, embodying a program of instructions executable by the processor to perform method steps for advertising in a mobile communication system. The method steps include generating a request for advertisement information at a mobile communication device, transmitting at least the request for advertisement information to an advertisement device, providing requested advertisement information from the advertisement device, receiving at least the requested advertisement information provided by the advertisement device, storing at least the requested advertisement information, generating a request for connection to a second communication device, transmitting the request for connection and selected advertisement information from the requested advertisement information to the second communication device such that the selected advertisement information and notification information indicating the incoming request for connection are presented to a user of the second communication device when the request for connection is received and recording, at the second communication device, the selected advertisement information presented to the user.

A system for advertising in a mobile communication system according to an embodiment of the present disclosure includes a mobile communication device, a provider network adapted to allow communication with the mobile communication device, wherein the mobile communication device further includes a caller identification device adapted to identify a telephone number of an incoming request for connection to the mobile communication device, a local advertisement device adapted to store a plurality of advertisement information related to a plurality of individuals identified at least by telephone number, wherein the local advertisement device compares the identified telephone number to telephone numbers of the plurality of individuals and provides specific advertisement information related to a matching individual and an interface device adapted to present the specific advertisement information to a user of the mobile communication device with notification information indicating the incoming request for connection.

A method for advertising in a mobile communication system according to another embodiment of the present disclosure includes identifying a telephone number of an incoming request for connection to a mobile communication device, comparing the identified telephone number to telephone numbers of a plurality of individuals, wherein the telephone numbers of the plurality of individuals are stored in a local advertisement device along with related advertisement information related to each of the plurality of individuals, providing specific advertisement information related to a matching individual when the identified telephone number matches the telephone number of the matching individual and presenting the specific advertisement information to a user of the mobile communication device with notification information indicating the incoming request for connection via an interface device.

A system for advertising in a mobile communication system according to an embodiment of the present disclosure includes an advertisement device adapted to store a plurality of advertisement information and to provide requested advertisement information, a mobile communication device and a provider network adapted to provide communication between the advertisement device and the mobile communication device, wherein the mobile communication device further includes a requesting device adapted to generate a request for advertisement information from the advertisement device, a transmission/receiving device adapted to transmit information, including the request for connection and to receive information, including the requested advertisement information via the provider network, a storage device adapted to store at least requested advertisement information from the advertisement device provided in response to the request and an interface device adapted to present selected advertisement information from the requested advertisement information to a user of the mobile communication device when a request for connection to a second communication device is received by the mobile communication device along with notification information indicating the incoming request for connection.

A method for advertising in a mobile communication system according to another embodiment of the present disclosure includes generating a request for advertisement information, transmitting the request for advertisement information to an advertisement device, wherein the advertisement device stores a plurality of advertisement information, receiving requested advertisement information from the advertisement device, storing the requested advertisement information in a storage device, and presenting selected advertisement information along with notification information indicating an incoming request for connection to a user of a mobile communication device when a request for connection is received by the mobile communication device.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION OF THE DISCLOSURE

Mobile communication systems typically include at least one mobile communication device, or client device and a system operator, or provider network, typically a cellular network, that enables communication between the client device and other communication devices. That is, the provider network allows the mobile communication device or devices to communicate with other mobile communication devices and with other communication devices, such as conventional telephones. In addition, the provider network may allow the mobile communication device to communicate with internet service providers so that the mobile communication device can access the internet. More specifically, mobile communication devices commonly use wireless application protocol (WAP) to access the internet. Mobile communication devices commonly include both voice communication capabilities as well as data communication capabilities, thus allowing users to make telephone calls and to send and receive various data, including, for example, text data, audio data and/or graphical data. Examples of mobile communication systems include cellular telephone systems, such as those using CDMA technology, popular in the United States, and GSM technology which is popular in Europe and Asia.

The system and method of the present disclosure may be implemented in the form of a software application running on a computer system such as a mainframe, personal computer (PC), handheld computer, server etc. The computer system may be linked to a database or various types of storage media. The link may be, for example, via a direct link such as a direct hard wire or wireless connection, via a network connection such as a local area network, or via the Internet.

Figure 9:
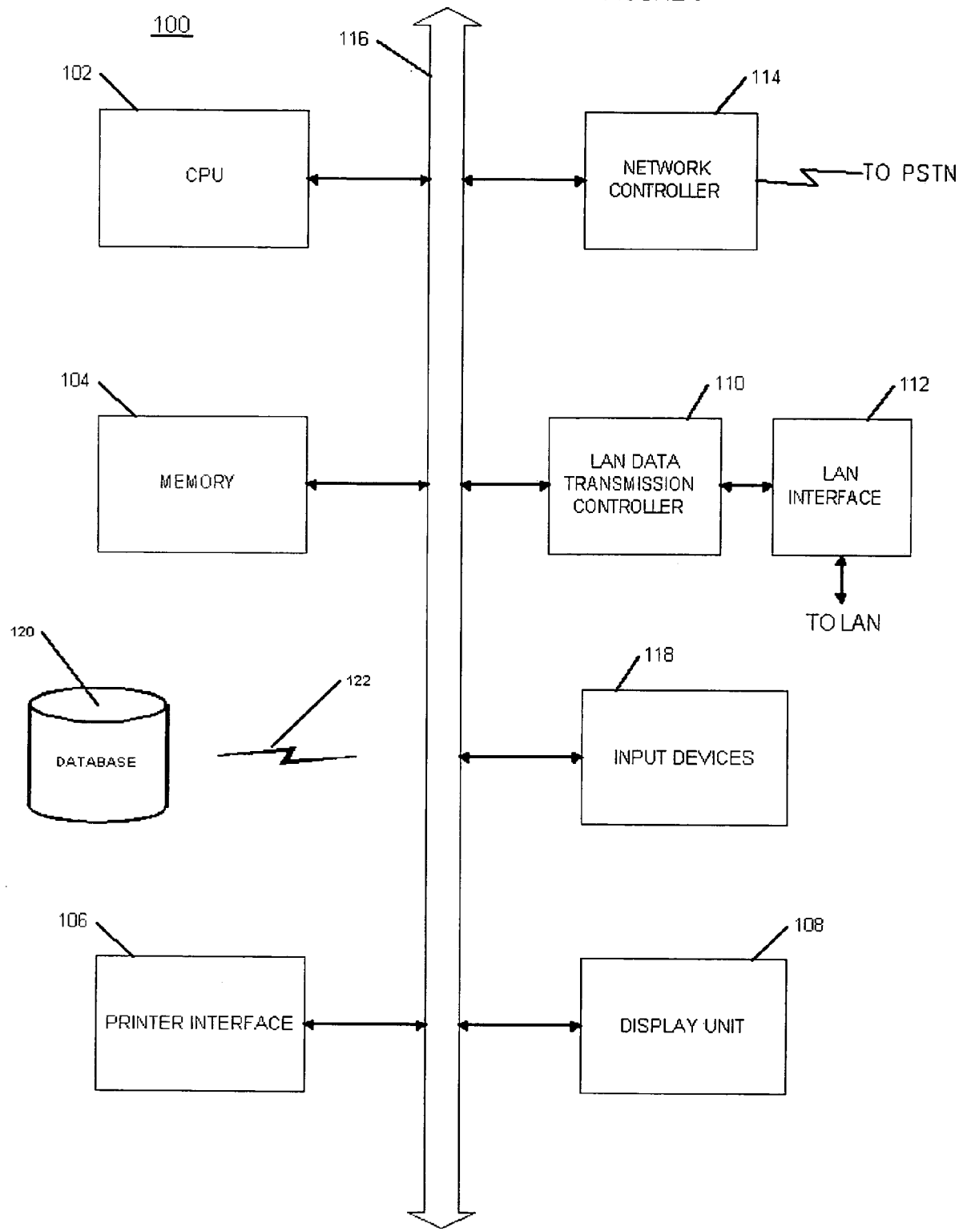
FIG. 9 is an illustration of a computer system for implementing a method and system according to the present disclosure.
Figure 10:
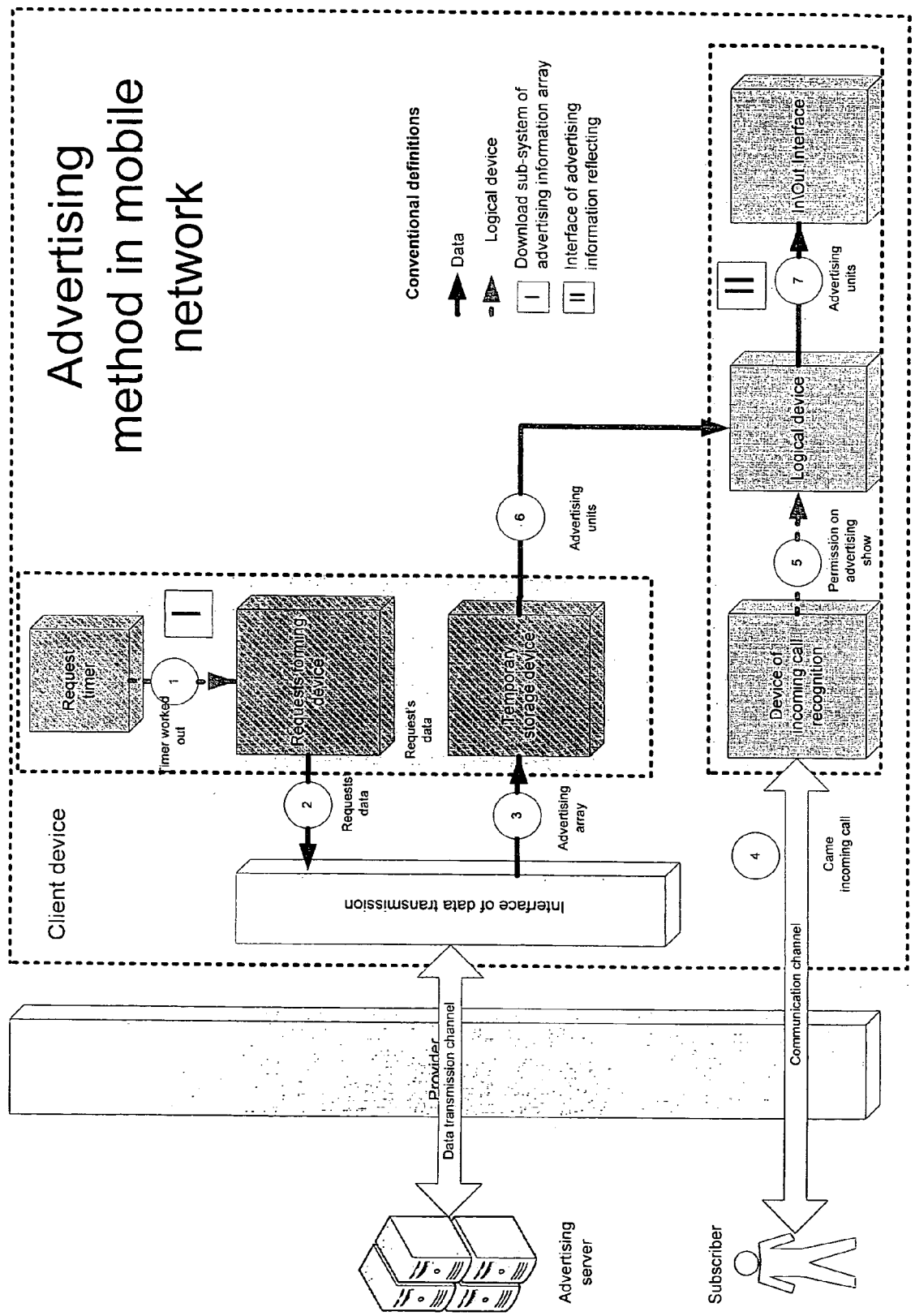
FIG. 10 is an illustration of an advertising method in a mobile network according to an embodiment of the present disclosure.
Figure 11:
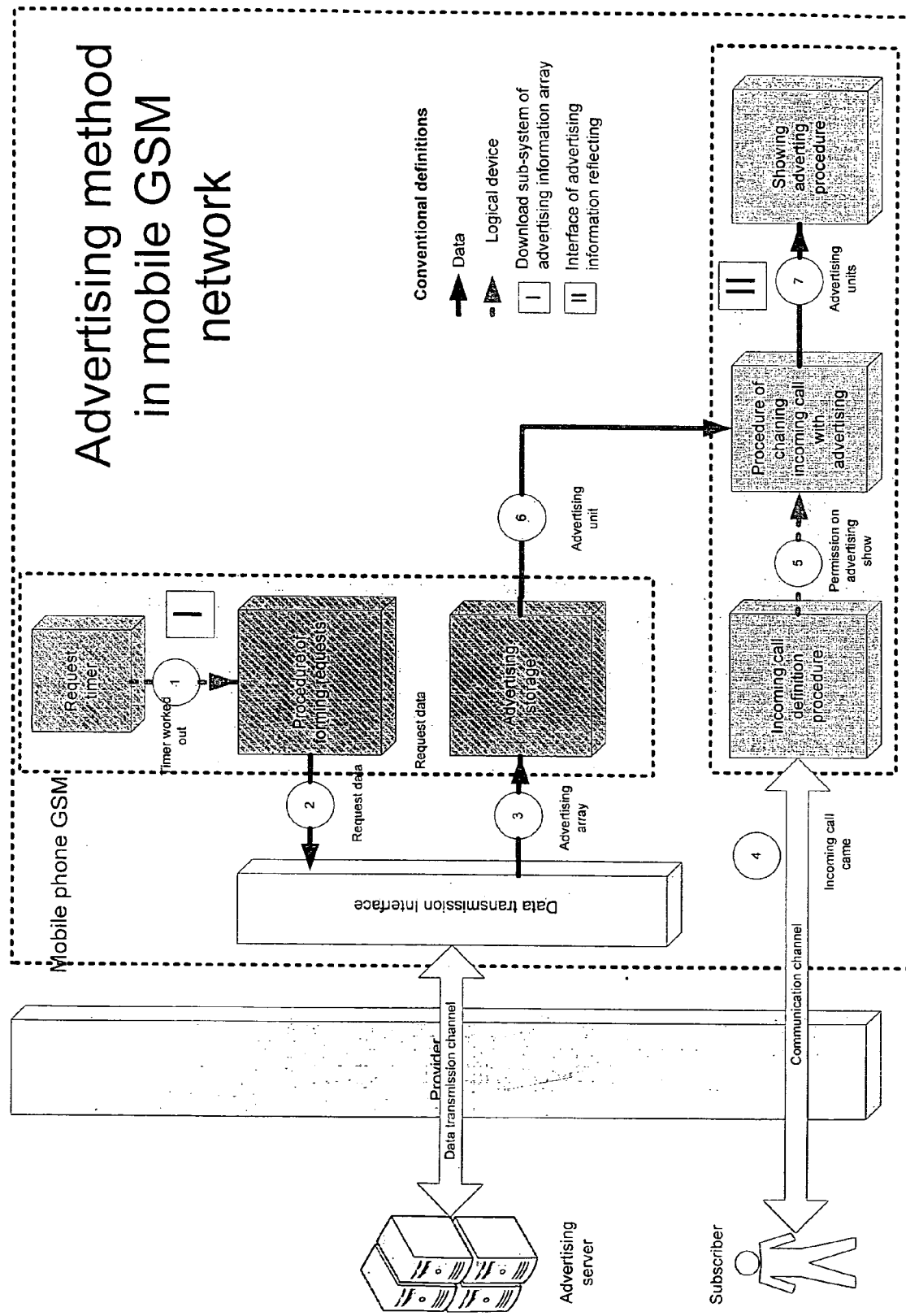
FIG. 11 is an illustration of an advertising method in a mobile GSM network according to an embodiment of the present disclosure.
Figure 12:
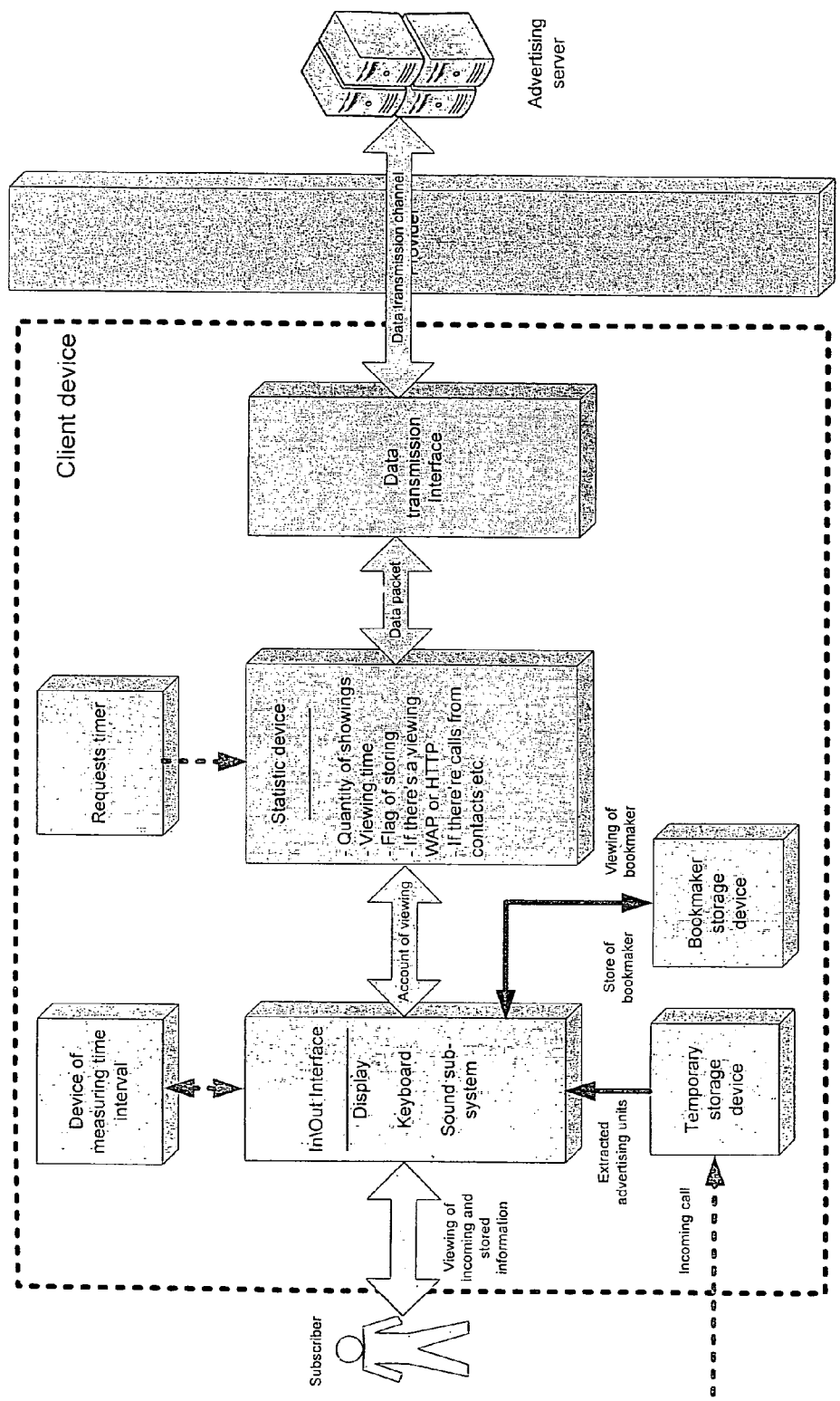
FIG. 12 is an illustration of a method of saving advertisement information for an advertising system in a mobile network according to an embodiment of the present disclosure.
Figure 13:
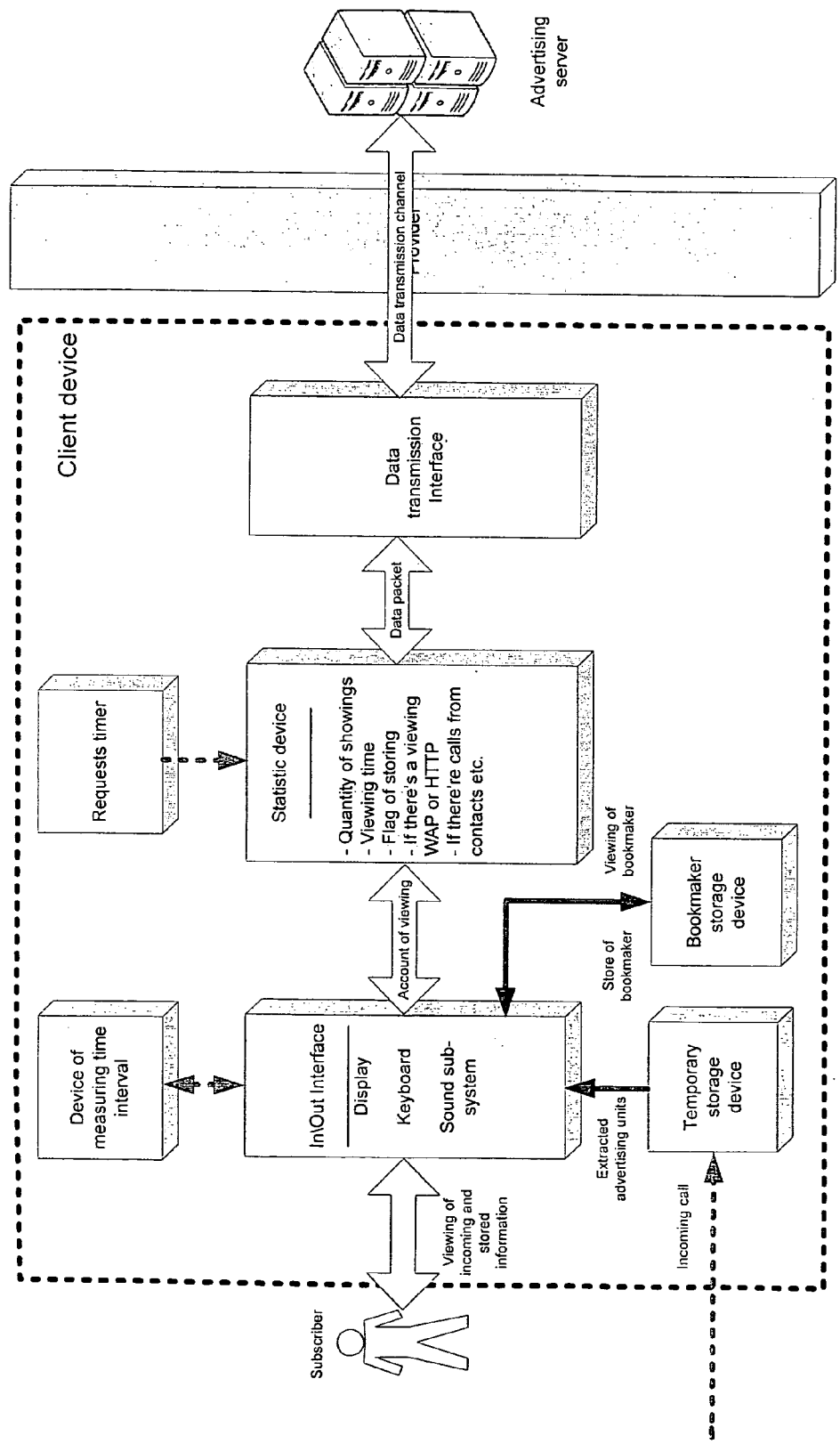
FIG. 13 is an illustration of a method of saving advertisement information for an advertising system in a GSM mobile network according to an embodiment of the present disclosure.
Figure 14:
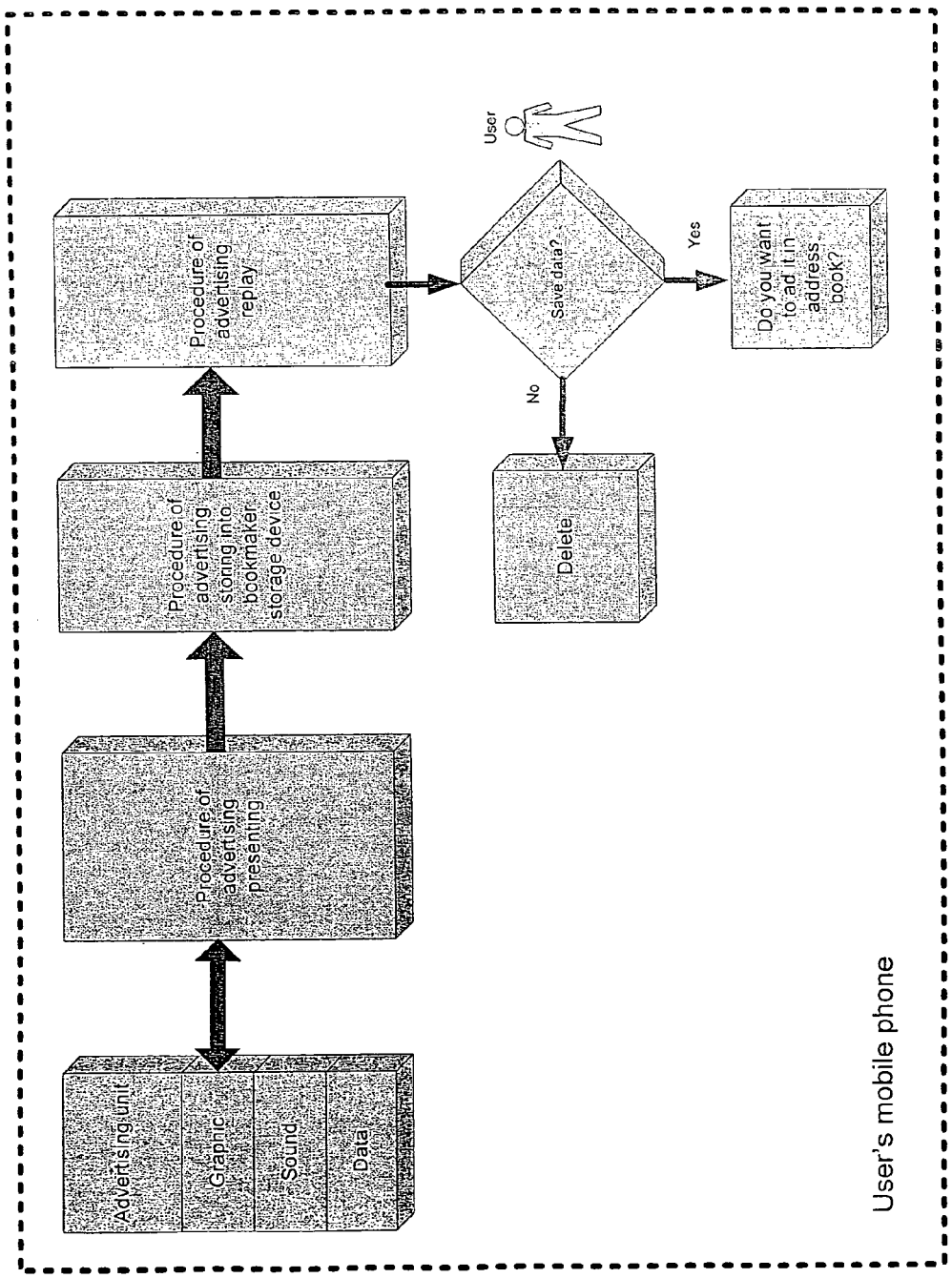
FIG. 14 is an illustration of generating statistic information of an advertising system in a mobile network according to an embodiment of the present disclosure.
Figure 15:
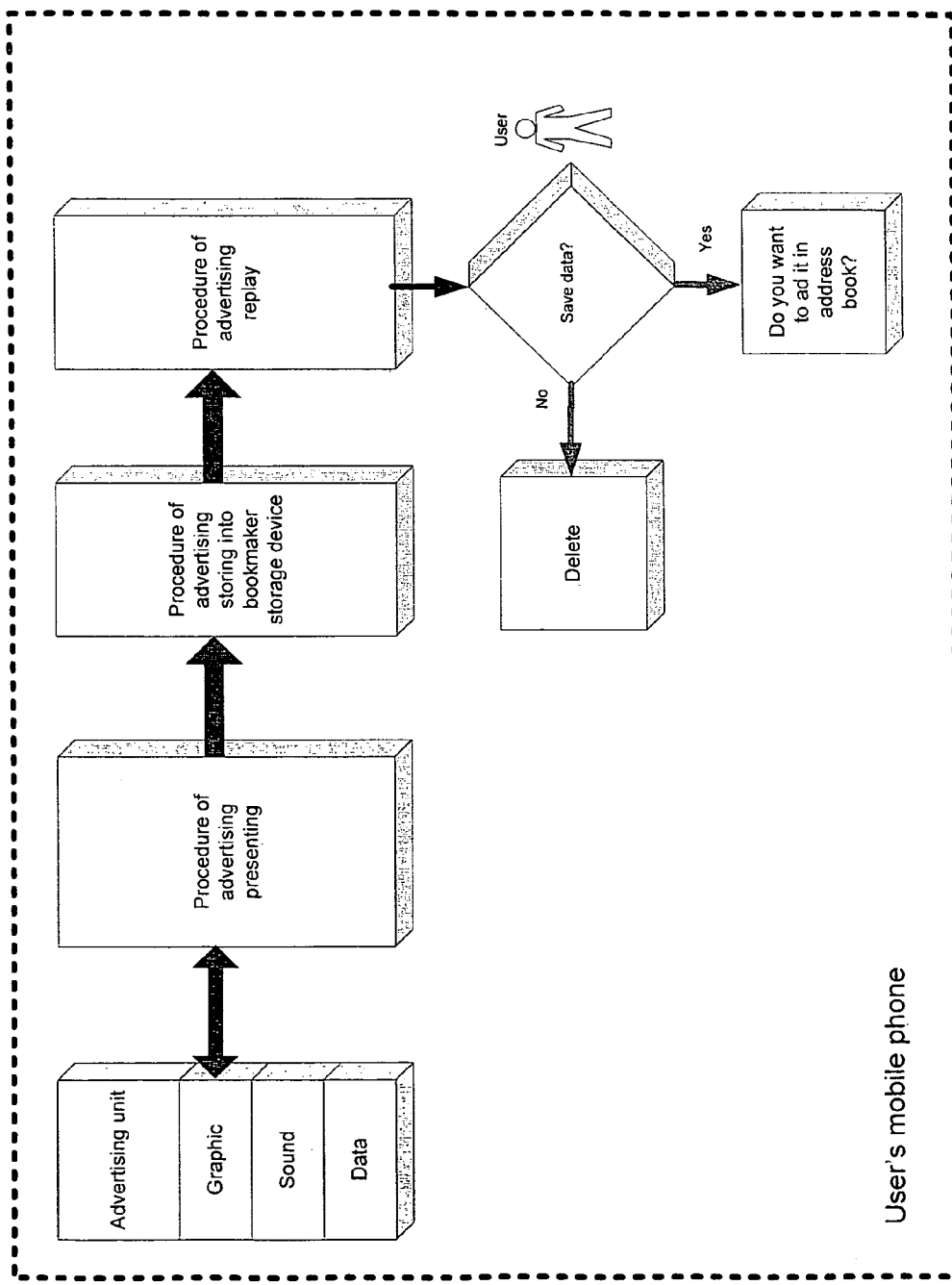
FIG. 15 is an illustration of generating statistic information of an advertising system in a GSM mobile network according to an embodiment of the present disclosure.
Figure 16:
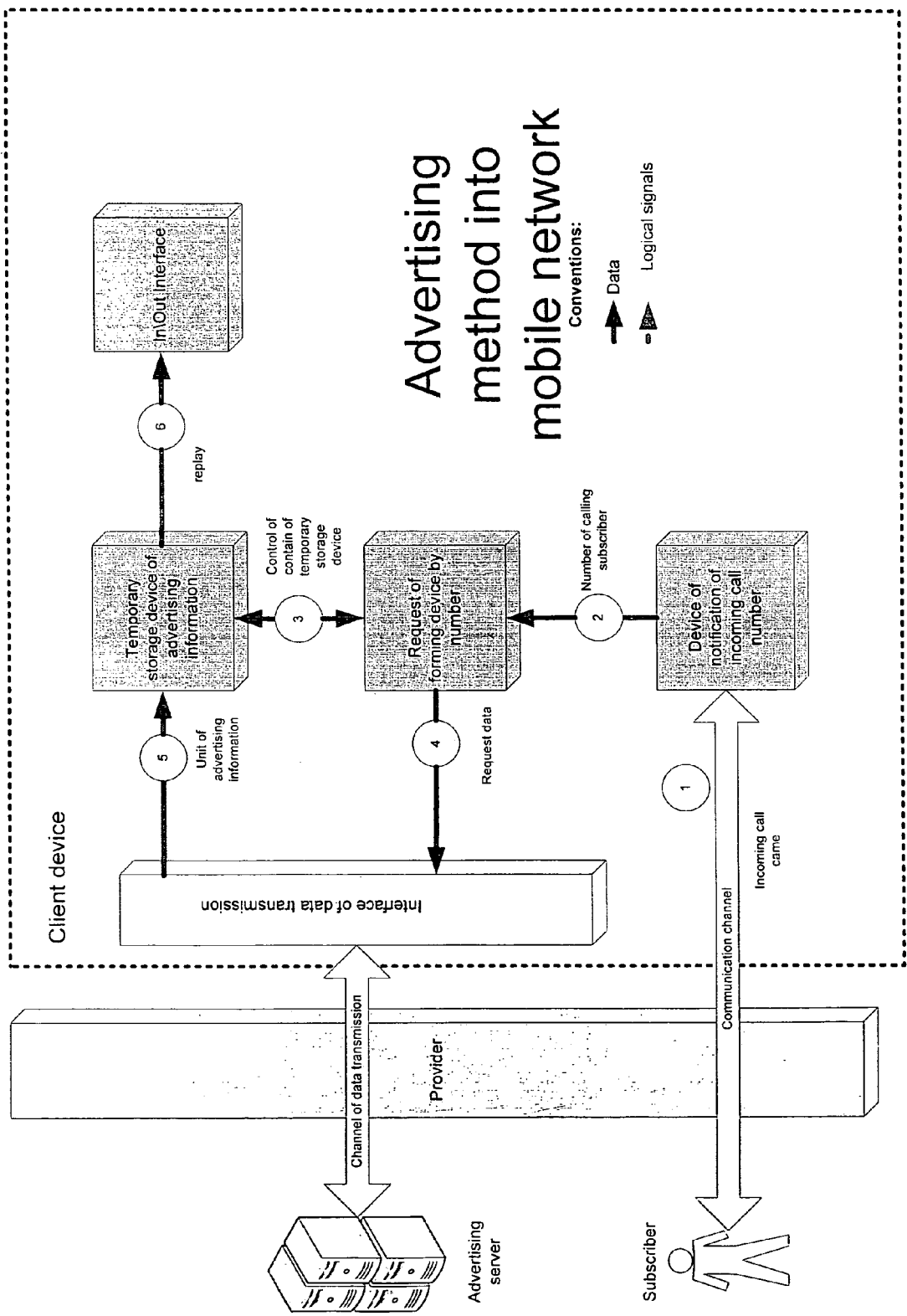
FIG. 16 is an illustration of a method of advertising in a mobile network according to an embodiment of the present disclosure.
Figure 17:
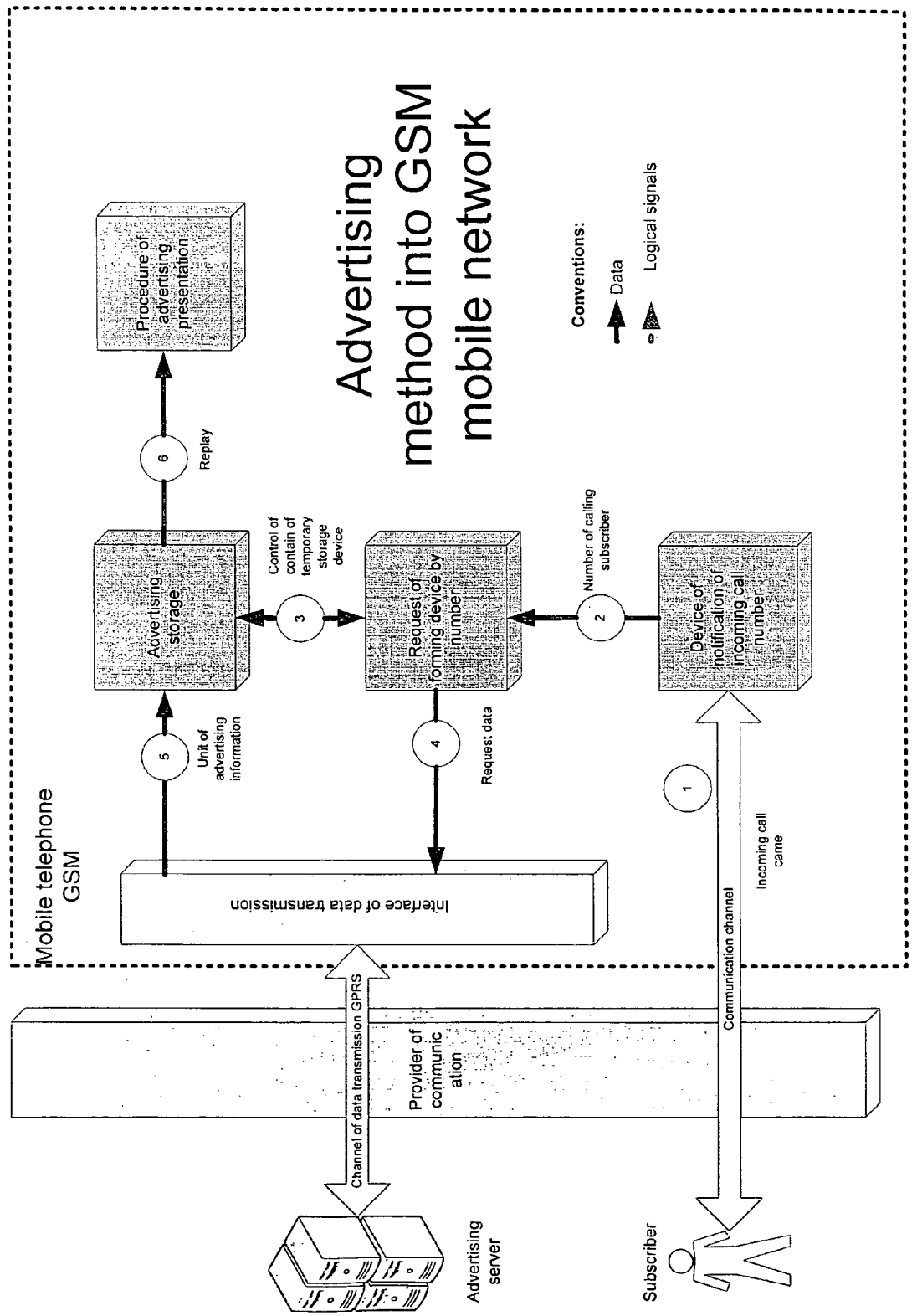
FIG. 17 is an illustration of a method of advertising in a GSM mobile network according to an embodiment of the present disclosure.

An example of a computer system capable of implementing the present system and method is shown in FIG. 9. The computer system referred to generally as system 100 may include a central processing unit (CPU) 102, memory 104, a printer interface 106, a display unit 108, a LAN (local area network) data transmission controller 110, a LAN interface 112, a network controller 114, an internal bus 116, a database 120 and one or more input devices 118 such as, for example, a keyboard, mouse, etc. Naturally, other components may be included in the computer system 100 and some components may not be present.

Figure 1:
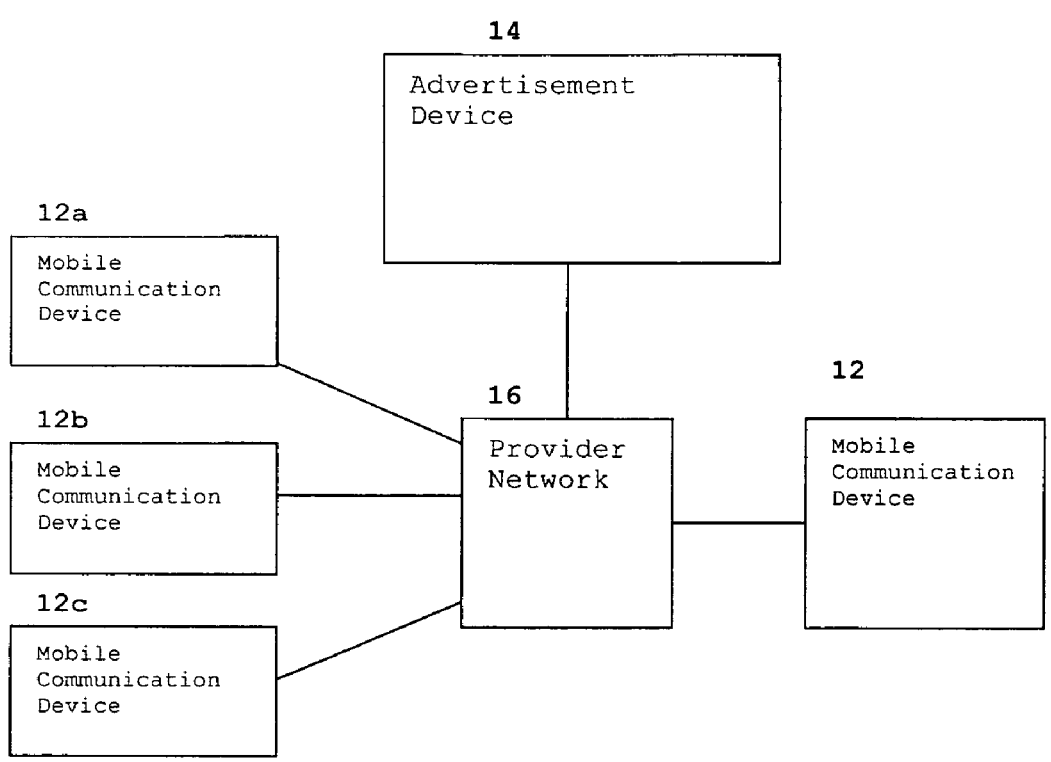
FIG. 1 is a block diagram of a system for advertising in a mobile communication system according to an embodiment of the present disclosure.

FIG. 1 illustrates a system for advertising in a mobile communication system in accordance with one embodiment of the present disclosure. The system includes at least one mobile communication device 12, an advertisement device 14 and a provider network 16 allowing for communication between at least the mobile communication device and the advertisement device. Additional mobile communication devices 12a, 12b, 12c may also be included.

Figure 2:
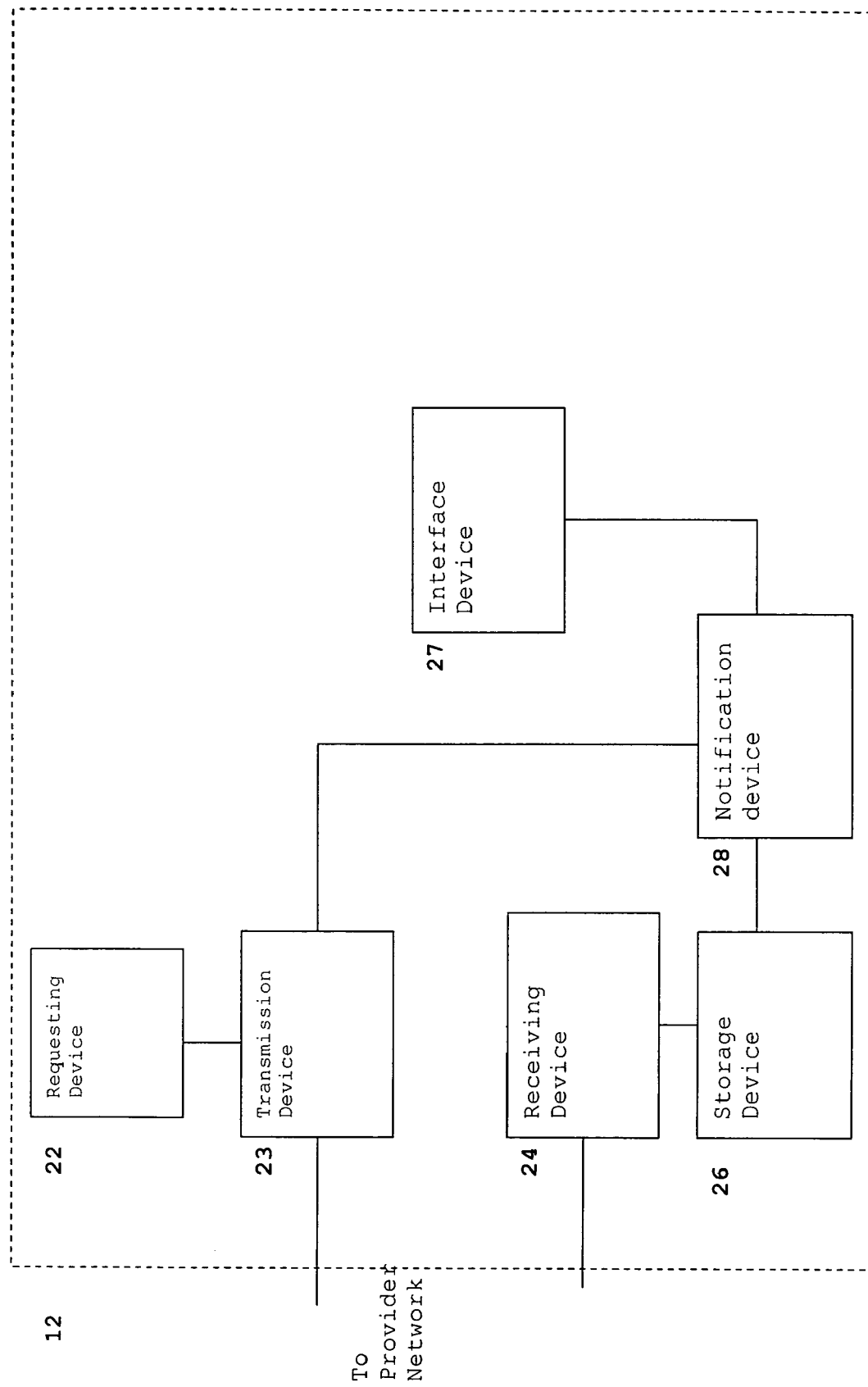
FIG. 2 is a block diagram illustrating a mobile communication device of the system for advertising in a mobile communication system of FIG. 1.

FIG. 2 illustrates the mobile communication device 12 of FIG. 1 in greater detail. The mobile communication device 12 preferably includes a requesting device 22 adapted to generate a request for advertisement information. A transmission device 23 is adapted to transmit at least the request for advertisement information to the advertisement device 14 via the provider network 16. A receiving device 24 is adapted to receive at least requested advertisement information from the advertisement device 14. A storage device 26 is adapted to store at least the requested advertisement information. An interface device 27 is adapted to present at least selected advertisement information from the requested advertisement information to a user of the mobile communication device when an incoming request for connection to the mobile communication device 12 is received. Notification device 28 may be adapted to record the advertisement information presented to the user. A controller (not shown) such as a microprocessor, for example, may also be included to control the requesting device 22, the transmission device 23, the receiving device 24, the storage device 26, the interface device 27 and the notification device 29.

The requesting device 22 generates a request for advertisement information to be sent to the advertisement device 14. The request preferably includes feature information related to the features of the mobile communication device 12. The feature information preferably includes information related to a size of a display of the mobile communication device 12, the limitations of the display, and/or the audio capabilities of the mobile communication device, for example.

The transmission device 23 transmits at least the request for advertisement information to the advertisement device 14 via provider network 16. The transmission device 23 may also be used to transmit any other information on behalf of the mobile communication device 12. That is, the single transmission device 23 may be used to transmit all information from the mobile communication device 12 via the provider network 16.

The advertisement device 14 stores a plurality of advertisement information and provides requested advertisement information to the mobile communication device 12. The advertisement device 14 is preferably an advertisement server storing a plurality of advertisement information. More specifically, the advertisement device 14 stores a plurality of advertisement information units, with each advertisement information unit preferably including advertisement information related to a single advertisement. A single advertisement may be related to a single advertiser or may be related to a single product or service. The advertisement device 14 provides requested advertisement information in response to the request transmitted by the transmission device 23 of the mobile communication device 12. The requested advertisement information preferably includes multiple advertisement information units, however, a single advertisement information unit may be sufficient.

The advertisement information stored in the advertisement device 14 may be graphical, text and/or audio information. Each advertisement information unit may also include a name of an advertiser, a telephone or facsimile number of the advertiser and any other desired information, such as a URL for the advertiser's web site. Each advertisement information unit preferably also includes a presentation number indicating the number of times the advertisement information unit is to be presented to the user of the mobile communication device 12. The advertisement device 14 preferably provides the requested advertisement information in response to the request for advertisement information based on the feature information included in the request. That is, the requested advertisement information sent to the mobile communication device 12 is compatible with the capabilities of the mobile communication device. The requested advertisement information is preferably transmitted to the mobile communication device 12 via the provider network 16.

The receiving device 24 receives the requested advertisement information from the advertisement device 14. The receiving device 24 preferably receives all incoming information including incoming voice information during telephone conversations and incoming requests for connection to other client devices, for example. That is, the single receiving device 24 may be utilized to receive all information. While a separate transmission device 22 and a separate receiving device 24 are specifically discussed, a transmission/reception device (see FIG. 8) which provides both transmission and receiving capabilities may also be used. Such devices are commonly used in mobile communication systems.

The storage device 26 stores the requested advertisement information received by the mobile communication device 12. The storage device 26 may be any storage medium and may store other information in addition to the advertisement information, if desired.

The interface device 27 presents information to the user of the mobile communication device 12. That is, the interface device 27 provides an interface between the user and the mobile communication device 12. The interface device 27 may include a display screen (not shown) for displaying text or graphics to the user. The interface device 27 may also include speakers or any other audio device for producing sound such that audio advertisement information may be presented to the user.

Selected advertisement information from the requested advertisement information stored in the storage device 26 is presented to the user via the interface device 27 when a request for connection to the mobile communication device 12 is received from another, or second, communication device. The selected advertisement information is preferably a single advertisement information unit. Preferably, the other communication device is another mobile communication device. The request for connection commonly includes information related to the telephone number of the other communication device which is commonly displayed to a used of the mobile communication device 12, for example on the display screen of the interface device 27. Since the telephone number does not take up much space on the display, however, when a request for connection is received, selected advertisement information from the requested advertisement information stored in the storage device 26 is also presented to the user. The selected advertisement information may be text information, graphical information and/or audio information. The selected advertisement information is preferably presented to the user until the user accepts the request for connection. In this manner, the selected advertisement information is presented to the user, however, the presentation does not disrupt use of the mobile communication device 12 or distract the user after communication with the other communication device has begun. Since the user's attention is generally drawn to the interface device 27 when a request for connection is received, the user will commonly view the selected advertisement information.

The request for connection may also include enablement information. The enablement information enables the presentation of advertisement information to the user of the mobile communication device 12. If no enablement information is included with the request for connection, the interface device 27 will not display the selected advertisement information to the user.

The generation of the request for advertisement information, the sending of the request, the provision of advertisement information, the reception of the requested advertisement information and the storage of the advertisement information by the requesting device 22, transmission device 23, advertisement device 14, receiving device 24 and the storage device 26, respectively, are preferably performed while the mobile communication device 12 is in stand by mode. That is, when the mobile communication device is "standing by" for communication with another communication device. A request timer (not shown) may be utilized such that requests for advertisement information generated by the requesting device 22 are generated periodically while the mobile communication device is in stand by mode. In this manner, additional advertisement information may be stored in the storage device 26 and/or new advertisement information may replace previous advertisement information in the storage device 26.

In a preferred embodiment, the request for advertisement information, the sending of the request, the provision of advertisement information, the reception of the requested advertisement information and the storage of the advertisement information by the requesting device 22, transmission device 23, advertisement device 14, receiving device 24 and the storage device 26, respectively, are performed during a non-peak time on the provider network. Thus, the communication of the request and the provision of the advertisement information are performed at a time when there is little activity on the provider network, hence leaving the network more free during peak hours.

The notification device 28 may be included in the mobile communication device 12 to record the advertisement information presented to the user. The notification device 28 collects and records the advertisement information, more specifically, the advertisement information units presented to the user and provides statistic information related to the advertisement information unit or units presented to the user. The statistic information preferably indicates the specific advertisement information units presented to the user, the time during which each unit was presented to the user and the number of times each unit has been presented to the user. The user may also access the statistic information when desired to review the advertisement information units previously presented. The statistic information may also include flags indicating that the user has made use of the statistic information. The flags may indicate that the user has reviewed a specific advertisement information unit or units, has selected and stored some portion of an advertisement information unit or units, whether the user has connected to a web page or hyperlink identified in an advertisement information unit or units and/or telephone a telephone number included in an advertisement unit or units. The statistic information is preferably transmitted to the advertisement device 14 periodically, via the transmission device 23, for example, preferably while the mobile communication device 12 is in stand by mode.

The statistic information sent to the advertisement device 14 is preferably utilized to reduce any costs associated with the use of the mobile communication system by the user. For example, advertisers associated with the advertisement information reviewed by a specific user, may contribute to the costs of the use of the communication system by the user, or may contribute to the costs of receiving the individual telephone calls during which the advertisement information was presented.

Alternatively, the statistic information may be used to track usage of the system for advertising. That is, the statistic information may be used to provide information to advertisers regarding their advertisement to help them focus their advertising efforts.

Figure 5:
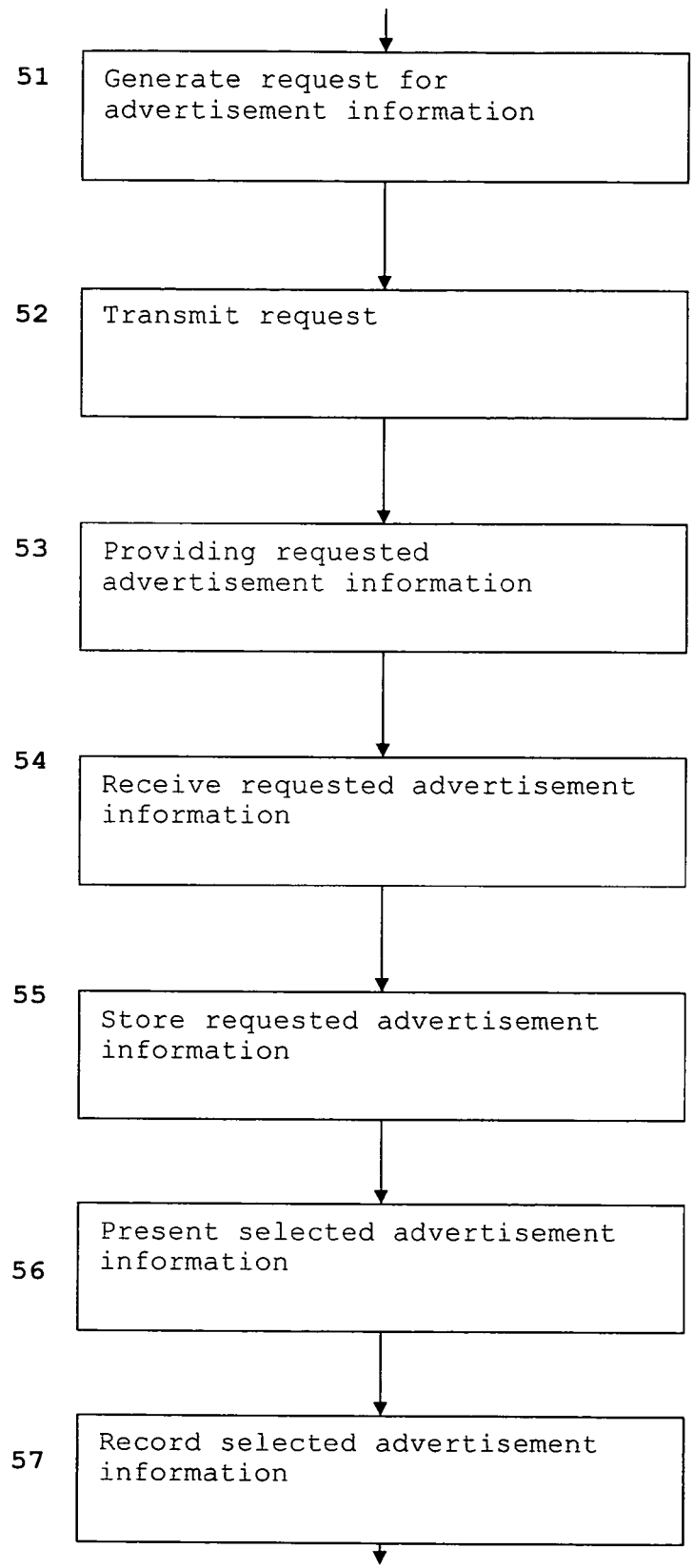
FIG. 5 is a flowchart illustrating a method of advertising in a mobile communication system according to one embodiment of the present disclosure.

A method of advertising in a mobile communication system is described with reference to FIG. 5. In step S51, a request for advertisement information is generated. The request for advertisement information is transmitted to an advertisement device in step S52. In step S53, requested advertisement information is provided from the advertisement device. The requested advertisement information is received from the advertisement device at step S54. At step S55, at least the requested advertisement information is stored. Selected advertisement information from the requested advertisement information is presented to a user of the mobile communication device when a request for connection to a second communication device is received in step S56. In step S57, the selected advertisement information presented to the user is recorded. The method of FIG. 5 is substantially that implemented by the system for advertising in a mobile communication system described above with reference to FIGS. 1 and 2 and thus need not be described in further detail herein.

Figure 3:
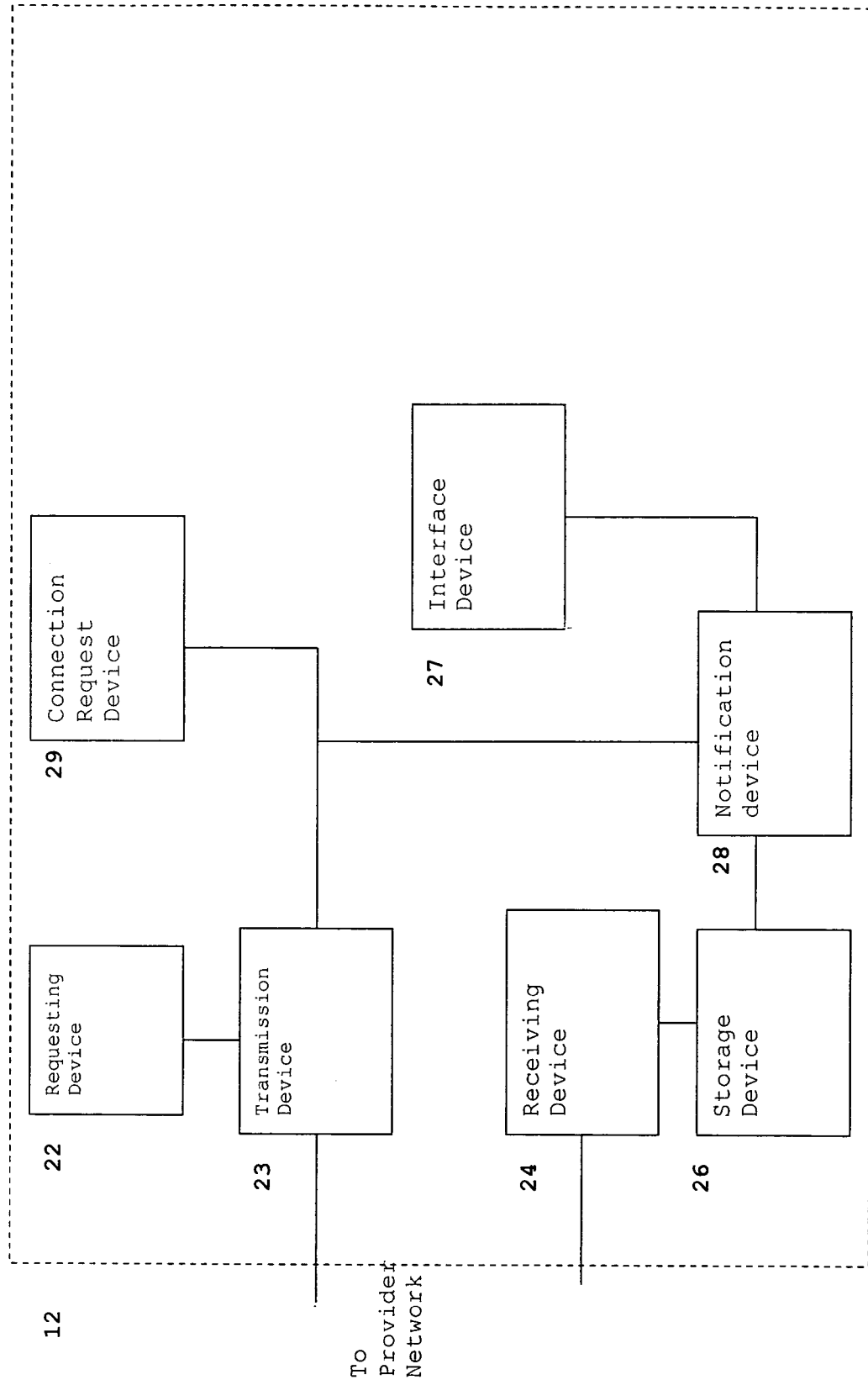
FIG. 3 is a block diagram of a system for advertising in a mobile communication system according to another embodiment of the present disclosure.

Another embodiment of a system for advertisement in a mobile communication system is described with reference to FIG. 3. The system of FIG. 3 is similar to that described above with reference to FIG. 1 and FIG. 2 and common reference numbers are used to refer to common elements. The system generally includes at least one mobile communication device 12 connected to an advertisement device 14 via provider network 16 as depicted in FIG. 1. The requesting device 22 of the mobile communication device 12 generates a request for advertisement information and the request is transmitted by transmission device 23 to the advertisement device 14. The advertisement device 14 provides requested advertisement information and sends the requested advertisement information to the mobile communication device 12 via the provider network 16. The receiving device 24 receives at least the requested advertisement information and the requested advertisement information is stored in storage device 26 in a manner substantially similar to that described above with reference to FIG. 2.

In the present embodiment, the mobile communication device 12 is a utilized as a calling communication device. That is, the mobile communication device 12 initiates communication with another, or second communication device. A connection request device 29 generates a request for connection to another communication device that is transmitted by the transmission device 23 to the other communication device via the provider network 16. In addition, selected advertisement information from the requested advertisement stored in the storage device 26 is transmitted with the request for connection and is presented to a user of the other communication device when the request for connection is received. In a preferred embodiment, the other communication device is substantially similar to the mobile communication device 12 described above with reference to FIGS. 1 and 2. Thus, a notification device similar to the notification device 27 described above with reference to FIG. 2 records advertisement information presented to the user of the second communication device and provides statistic information to be transmitted to the advertisement device 14 in a manner similar to that described above. In this embodiment, the statistic information may be utilized offset the cost of using the mobile communications system to the user of the mobile communication device, the user of the second communication device, or to both users.

Figure 6:
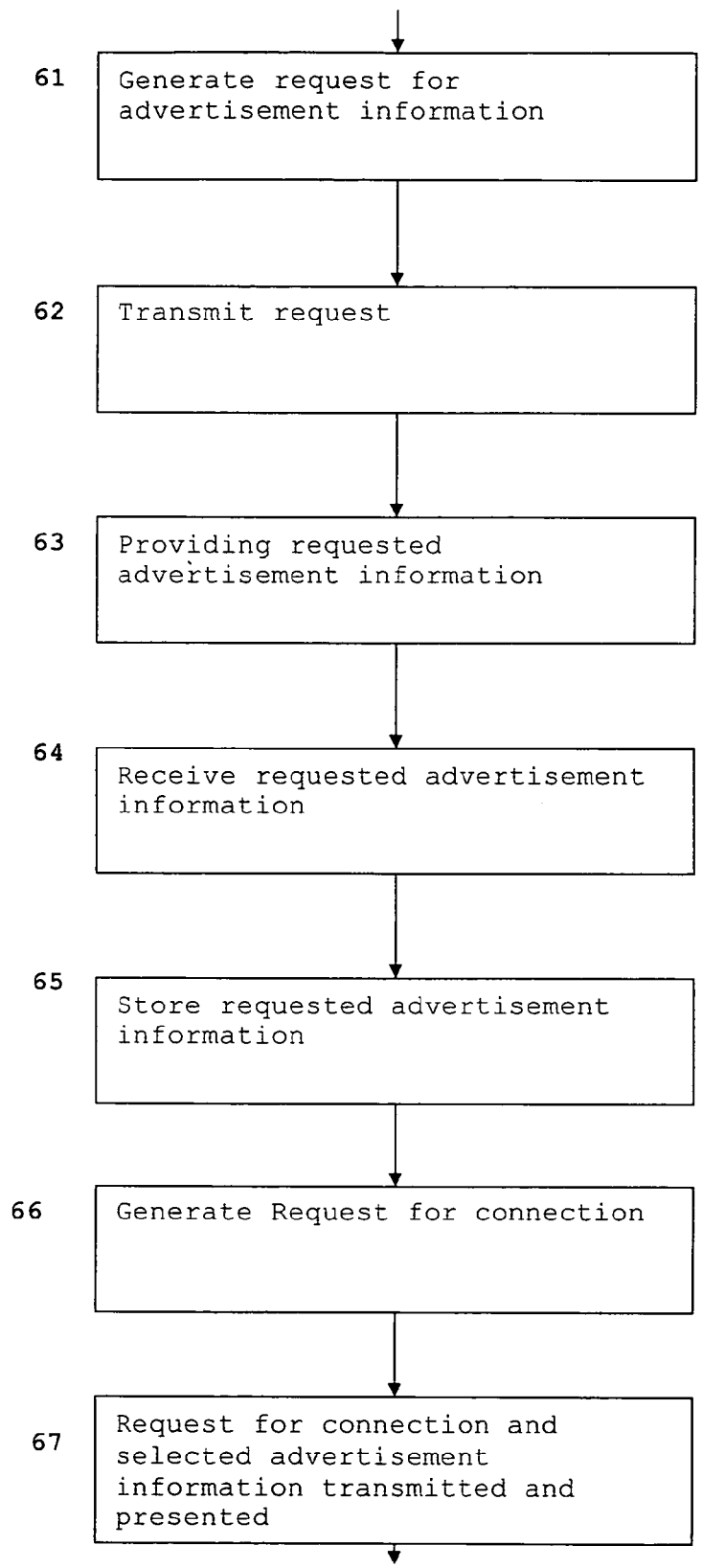
FIG. 6 is a flowchart illustrating a method of advertising in a mobile communication system according to an embodiment of the present disclosure.

A method for advertising in a mobile communication system according to another embodiment of the present disclosure is described with reference with FIG. 6. In step S61, a request for advertisement information is generated at a mobile communication device. At step S62, the request for advertisement information is transmitted to an advertisement device. At step S63, requested advertisement information is provided from the advertisement device. In step S64, at least the requested advertisement information provided by the advertisement device is received. At step S65, the requested advertisement information is stored. A request for connection to a second communication device is generated at step S66. In step S67, the request for connection and selected advertisement information from the requested advertisement information are transmitted to the second communication device such that the selected advertisement information and notification information indicating the request for connection are presented to a user of the second communication device when the request for connection is received. In step S68, the selected advertisement information presented to the user of the second communication device is recorded. The method of FIG. 6 is substantially similar to that utilized by the system described above with reference to FIG. 3, and thus, need not be discussed in further detail.

As noted above, it is common for mobile communication devices to include a caller identification function. That is, it is common for mobile communication devices to display the telephone number from which an incoming request for connection originates. In addition, many mobile communication devices may store the telephone number, name and other information of various parties, or contacts of the user, in an electronic phonebook to allow the user easy access to the names and telephone numbers of their contacts. Many mobile communication devices will attempt to match the telephone number of an incoming request for connection to a telephone number stored in the electronic phonebook and will display the name of the individual related to the telephone number of the incoming call when a match is found.

Another embodiment of a system for advertising in a mobile communication is described with reference to FIG. 4. The system includes an advertisement device 14 adapted to store a plurality of advertisement information and to provide requested advertisement information, a mobile communication device 12 and a provider network 16 adapted to allow communication at least between the advertisement device and the mobile communication device similar to those provided in the system described above with reference to FIG. 1 and common reference numbers are used to refer to common elements.

Figure 4:
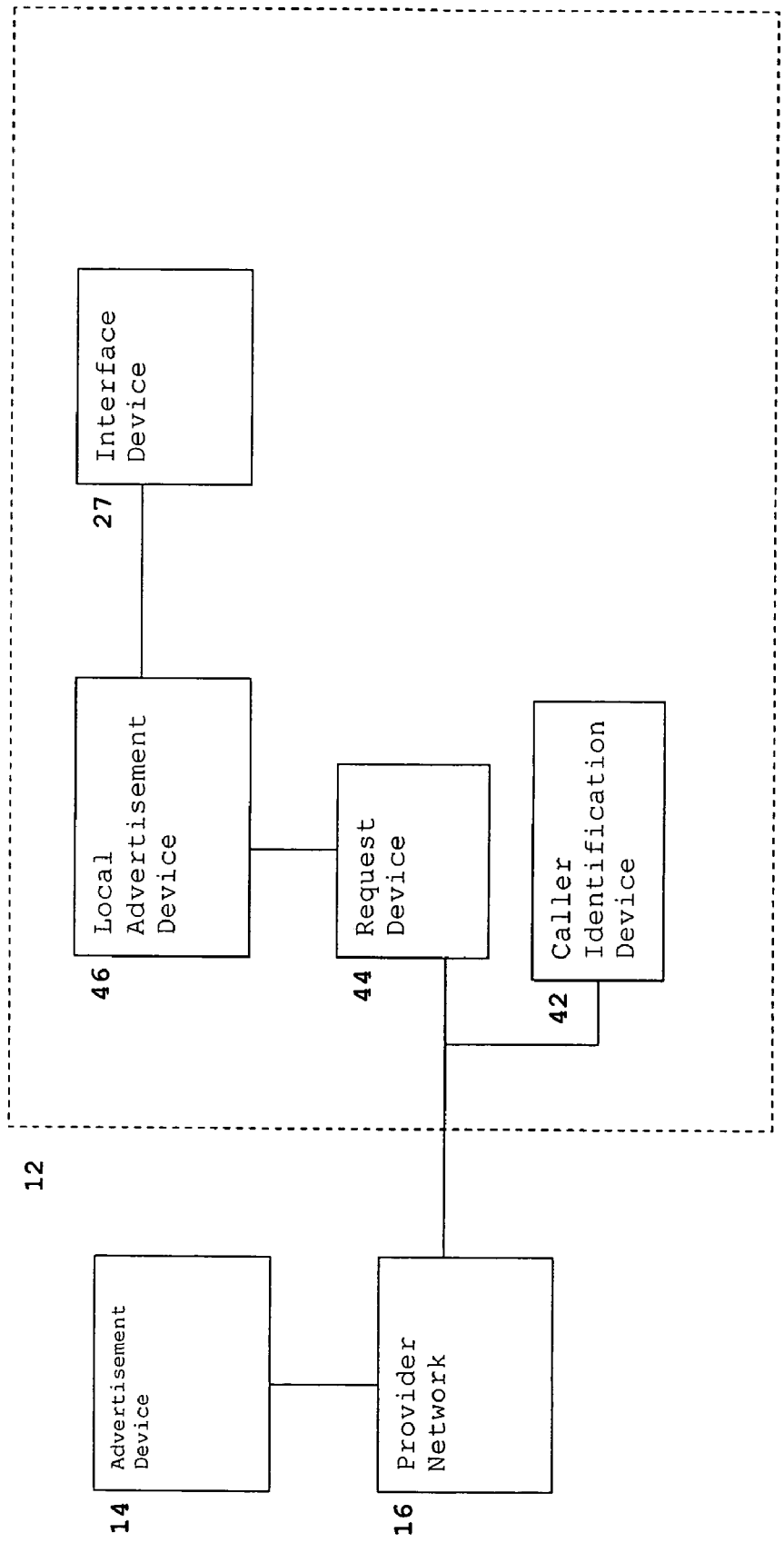
FIG. 4 is a block diagram of a system for advertising in a mobile communication system according to an embodiment of the present disclosure.

FIG. 4 is a more detailed illustration of the mobile communication device 12. The mobile communication device includes a caller identification device 42 adapted to identify a telephone number of an incoming request for connection to the mobile communication device. A request device 44 is adapted to request advertisement information based on the identified telephone number. Local advertisement device 46 is adapted to store a plurality of advertisement information related to a plurality of individuals identified at least by telephone number. The request device 44 requests advertisement information from the local advertisement device by passing the identified telephone number to the local advertisement device. The local advertising device compares the identified telephone number to telephone numbers of the plurality of individuals and provides the specific advertisement information related to a matching individual to the request device where it is sent to interface device 47 to be displayed to the user of the mobile communication device. Interface device 47 is substantially similar to the interface device 27 described above with reference to FIG. 2.

In the event that no matching individual is found in local advertisement device 46, the request device 44 requests advertisement information from the advertisement device 14. This request is performed is substantially the same manner as described above with reference to FIGS. 1 and 2. That is the request is generated by request device 44, transmitted to the advertisement device 14, which provides requested advertisement information that is received by the mobile communication device. In the present embodiment, the identified telephone number is sent with the request for advertisement information to the advertisement device 14. The advertisement device 14 provides requested advertisement information based on the identified telephone number to the request device. The requested advertisement device is presented to the user of the mobile communication device via the interface device 47. In addition, the requested advertisement device and the identified telephone number are stored in the local advertisement device for future use. The requested advertisement information includes a relevant period during which the requested advertisement information is relevant to the owner of the identified phone number. The requested advertisement information and identified telephone number are stored in the local advertisement device at least for the relevant time period.

Figure 7:
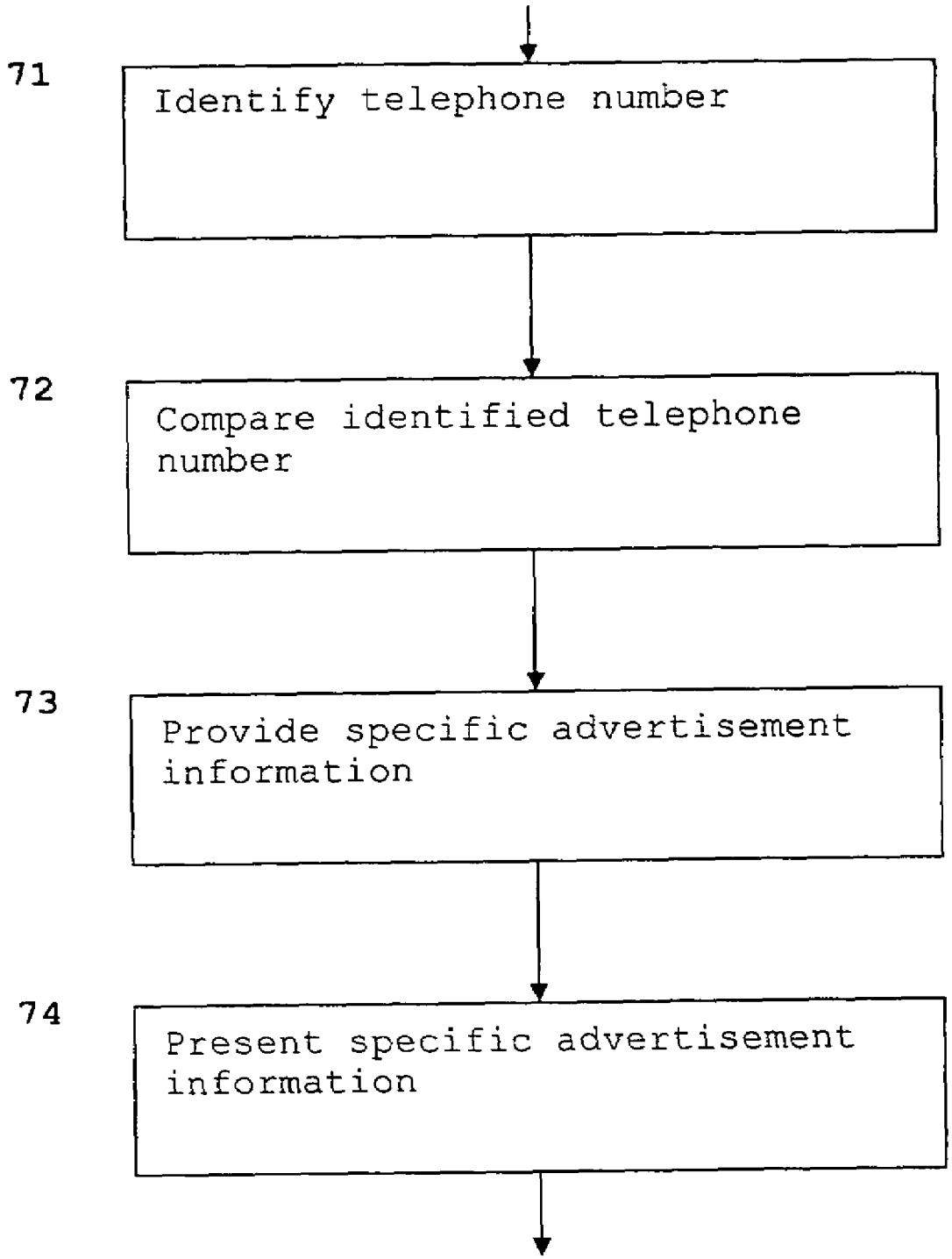
FIG. 7 is a flowchart illustrating a method of advertising in a mobile communication system according to another embodiment of the present disclosure.

A method for advertising in a mobile communication system according to another embodiment of the present disclosure is further described with reference to FIG. 7. At step S71, a telephone number of an incoming request for connection to a mobile communication device is identified. In step S72, the identified telephone number is compared to telephone numbers of a plurality of individuals, wherein the telephone numbers of the plurality of individuals are stored in a local advertisement device along with related advertisement information related to each of the plurality of individuals. At step S73, specific advertisement information related to a matching individual when the identified telephone number matches the telephone number of the matching individual is provided. At step S74, the specific advertisement information is presented to a user of the mobile communication device with notification information indicating the incoming request for connection via an interface device.

Figure 8:
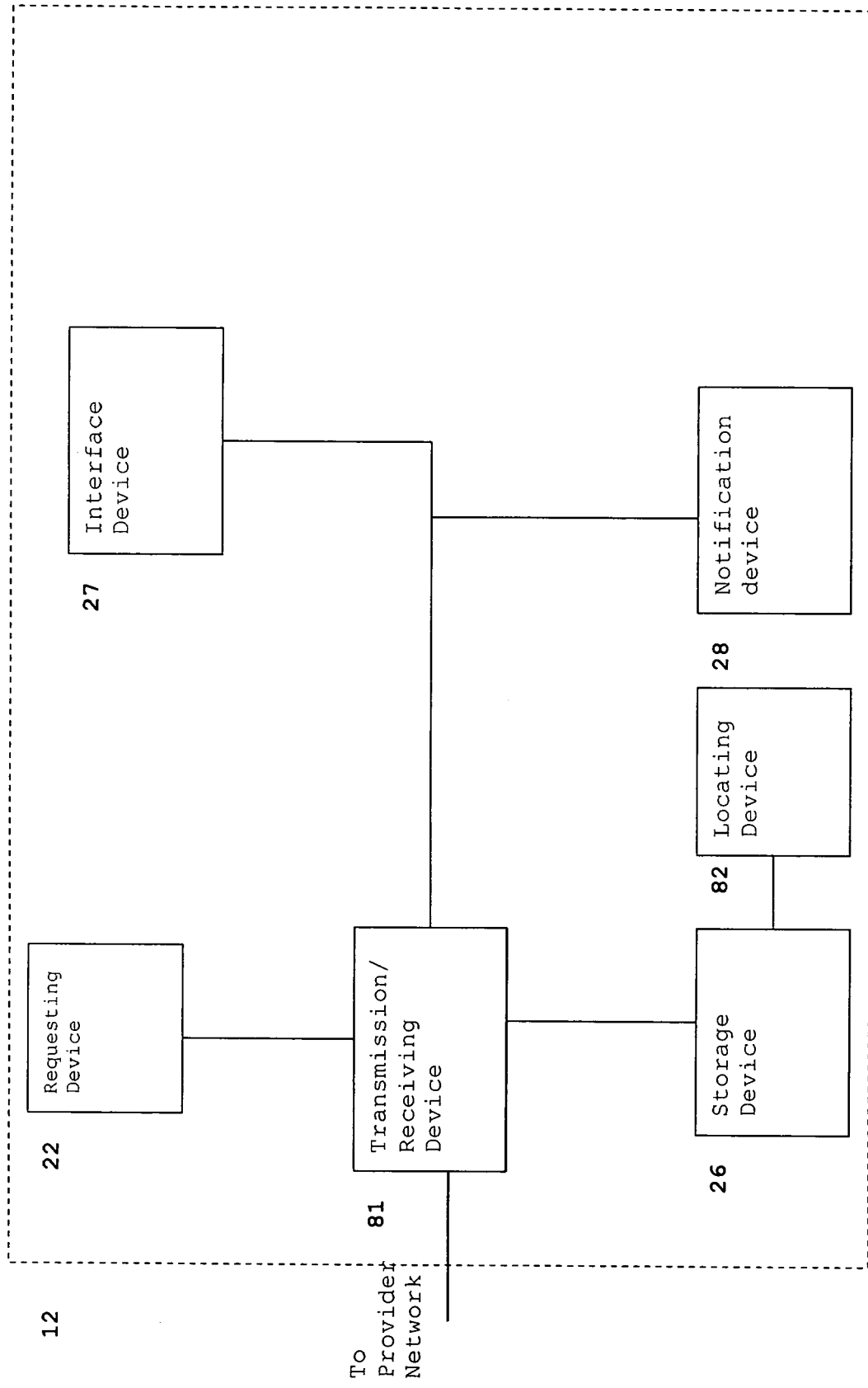
FIG. 8 is a block diagram illustrating a system of advertising in a mobile communication system according to an embodiment of the present disclosure.

Another embodiment of a system for advertising in a mobile communication system is further described with reference to FIG. 8. The system of FIG. 8 is substantially similar to that described above with reference the FIGS. 1 and 2 and common reference numbers are used to refer to common elements. The system of FIG. 8 further includes a transmission/receiving device 81 for transmitting and receiving information. In addition, a locating device 82, may be included to determine the location of the mobile communication device. Such a feature is commonly included in mobile communication devices. Such devices commonly utilize satellite signals or signals from the network provider to determine the location of the mobile communication device 12. The system of FIG. 8 operates in substantially the same manner as that described above with reference to FIG. 1. The transmission/receiving 81 device transmits and receives information including the request and the requested identification information. Locating device 82 provides location information that may be used to select the selected data presented to the user via the interface device 27.

The selected advertisement information presented to the user may be selected based on the location of the mobile communication device. In this manner, the user may be presented with advertisement information related to the area or neighborhood the user is in. The selected advertisement information may be selected based on the time of day, such that the user is presented with advertisement information relevant to the time of day. The requested advertisement information from the advertisement device 14 may include preference information, indicating that certain advertisement information is preferably presented to the user. For example, in certain situations, a specific advertiser may wish to have their advertisements displayed more often than others, the preference information may be utilized to increase presentation of such advertisement information.

The present disclosure may be conveniently implemented using one or more conventional general purpose digital computers and/or servers programmed according to the teachings of the present specification. Appropriate software coding can readily be prepared by skilled programmers based on the teachings of the present disclosure. The present disclosure may also be implemented by the preparation of application specific integrated circuits or by interconnecting an appropriate network of conventional components.

Numerous additional modifications and variations of the present disclosure are possible in view of the above-teachings. It is therefore to be understood that within the scope of the appended claims, the present disclosure may be practiced other than as specifically described herein.

What is claimed is:

1. A system for advertising in a mobile communication system comprises:
   an advertisement device adapted to store a plurality of advertisement information and to provide requested advertisement information;
   a mobile communication device; and
   a provider network adapted to provide communication between the advertisement device and the mobile communication device, wherein the mobile communication device further comprises:
   a requesting device adapted to generate a request for advertisement information;
   a transmission device adapted to send at least the request for advertisement information to the advertisement device;
   a receiving device adapted to receive at least the requested advertisement information provided by the advertisement device;
   a storage device adapted to store at least the requested advertisement information;
   an interface device adapted to present selected advertisement information from the requested advertisement information to a user of the mobile communication device when a request for connection to a second communication device is received by the mobile communication device along with notification information indicating the incoming request for connection; and
   a notification device adapted to record the selected advertisement information presented to the user by the interface device.

2. A system for advertising in a mobile communication system comprises:
   an advertisement device adapted to store a plurality of advertisement information and to provide requested advertisement information;
   a mobile communication device;
   a provider network adapted to provide communication between the advertisement device and the mobile communication device, wherein the mobile communication device further comprises:
   a requesting device adapted to generate a request for advertisement information,
   a transmission device adapted to send at least the request for advertisement information to the advertisement device,
   a receiving device adapted to receive at least the requested advertisement information provided by the advertisement device,
   a storage device adapted to store at least the requested advertisement information, a connection request device adapted to provide a request for connection to a second communication device, wherein
   selected advertisement information from the requested advertisement information and the request for connection are transmitted to the second communication device, such that the selected advertisement information is presented to a user of the second mobile communication device with notification information indicating the incoming request for connection; and
   a notification device, positioned at the second communication device, adapted to record the selected advertisement information presented to the user of the second communication device.

3. A method of advertising in a mobile communication system comprises:
   generating a request for advertisement information at a mobile communication device;
   transmitting at least the request for advertisement information to an advertisement device;
   providing requested advertisement information from the advertisement device;
   receiving at least the requested advertisement information provided by the advertisement device;
   storing at least the requested advertisement information;
   presenting selected advertisement information from the requested advertisement information and notification information indicating an incoming request for connection to a user of the mobile communication device when the request for connection to a second communication device is received; and
   recording the selected advertisement information presented to the user using a notification device.

4. A method for advertising in a mobile communication system comprises:
   generating a request for advertisement information at a mobile communication device;
   transmitting at least the request for advertisement information to an advertisement device;
   providing requested advertisement information from the advertisement device;
   receiving at least the requested advertisement information provided by the advertisement device;
   storing at least the requested advertisement information;
   generating a request for connection to a second communication device;
   transmitting the request for connection and selected advertisement information from the requested advertisement information to the second communication device such that the selected advertisement information and notification information indicating the request for connection are presented to a user of the second communication device when the request for connection is received; and
   recording, at the second communication device, the selected advertisement information presented to the user.

5. A computer system comprising:
   a processor; and a program storage device readable by the computer system, embodying a program of instructions executable by the processor to perform method steps for advertising in a mobile communication system, the method steps comprising:
   generating a request for advertisement information at a mobile communication device;
   transmitting at least the request for advertisement information to an advertisement device;
   providing requested advertisement information from the advertisement device;
   receiving at least the requested advertisement information provided by the advertisement device;
   storing at least the requested advertisement information;
   presenting selected advertisement information from the requested advertisement information and notification information indicating an incoming request for connection to a user of the mobile communication device when the request for connection to a second communication device is received; and recording the selected advertisement information presented to the user using a notification device.

6. A computer system comprising: a processor; and a program storage device readable by the computer system, embodying a program of instructions executable by the processor to perform method steps for advertising in a mobile communication system, the method steps comprising:

generating a request for advertisement information at a mobile communication device;

transmitting at least the request for advertisement information to an advertisement device;

providing requested advertisement information from the advertisement device;

receiving at least the requested advertisement information provided by the advertisement device;

storing at least the requested advertisement information;

generating a request for connection to a second communication device;

transmitting the request for connection and selected advertisement information from the requested advertisement information to the second communication device such that the selected advertisement information and notification information indicating the incoming request for connection are presented to a user of the second communication device when the request for connection is received; and recording, at the second communication device, the selected advertisement information presented to the user.

7. A system for advertising in a mobile communication system comprises:

a mobile communication device; and a provider network adapted to allow communication with the mobile communication device, wherein the mobile communication device further comprises:

a caller identification device adapted to identify a telephone number of an incoming request for connection to the mobile communication device;

a local advertisement device adapted to store a plurality of advertisement information related to a plurality of individuals identified at least by telephone number, wherein the local advertisement device compares the identified telephone number to telephone numbers of the plurality of individuals and provides specific advertisement information related to a matching individual; and an interface device adapted to present the specific advertisement information to a user of the mobile communication device with notification information indicating the incoming request for connection.

8. The system of claim 7, further comprising:

an advertising device adapted to store a plurality of advertisement information and to provide requested advertisement information, wherein the mobile communication device further comprises:

a requesting device adapted to request advertisement information based on the identified telephone number from the advertisement device when the local advertisement device does not provide the specific advertisement information related to the matching individual.

9. The system of claim 8, wherein the requesting device generates a request for advertisement information and sends the request to the advertisement device via the provider network when the local advertisement device does not provide specific advertisement information related to the matching individual.

10. The system of claim 9, wherein the requesting device sends the identified telephone number to the advertisement device with the request for advertisement information to the advertisement device.

11. The system of claim 10, wherein the advertisement device provides requested advertisement information to the requesting device based on the identified telephone number.

12. The system of claim 8, wherein the requested advertisement information is presented to the user of the mobile communication device via the interface device with the notification information indicating the incoming request for connection.

13. A method for advertising in a mobile communication system comprises:

identifying a telephone number of an incoming request for connection to a mobile communication device;

comparing the identified telephone number to telephone numbers of a plurality of individuals, wherein the telephone numbers of the plurality of individuals are stored in a local advertisement device along with related advertisement information related to each of the plurality of individuals;

providing specific advertisement information related to a matching individual when the identified telephone number matches the telephone number of the matching individual; and presenting the specific advertisement information to a user of the mobile communication device with notification information indicating the incoming request for connection via an interface device.

14. A computer system comprising: a processor; and a program storage device readable by the computer system, embodying a program of instructions executable by the processor to perform method steps for advertising in a mobile communication system, the method steps comprising:

identifying a telephone number of an incoming request for connection to a mobile communication device;

comparing the identified telephone number to telephone numbers of a plurality of individuals, wherein the telephone numbers of the plurality of individuals are stored in a local advertisement device along with related advertisement information related to each of the plurality of individuals;

providing specific advertisement information related to a matching individual when the identified telephone number matches the telephone number of the matching individual; and presenting the specific advertisement information to a user of the mobile communication device with notification information indicating the incoming request for connection via an interface device.

15. A system for advertising in a mobile communication system comprises:

an advertisement device adapted to store a plurality of advertisement information and to provide requested advertisement information;

a mobile communication device; and a provider network adapted to provide communication between the advertisement device and the mobile communication device, wherein the mobile communication device further comprises:

a requesting device adapted to generate a request for advertisement information from the advertisement device;

a transmission/receiving device adapted to transmit information, including the request for connection and to receive information, including the requested advertisement information via the provider network;

a storage device adapted to store at least requested advertisement information from the advertisement device provided in response to the request; and an interface device adapted to present selected advertisement information from the requested advertisement information to a user of the mobile communication device when a request for connection to a second communication device is received by the mobile communication device along with notification information indicating the incoming request for connection.

16. The system of claim 15, wherein the advertisement information stored on the advertisement device includes a plurality of advertisement information units, wherein each advertisement information unit includes advertisement information related to one advertisement.

17. The system of claim 16, wherein the requested advertisement information includes a plurality of advertisement information units.

18. The system of claim 17, wherein the request for connection is generated while the mobile communication device is in a stand by mode.

19. The system of claim 18, wherein the request for connection is generated and transmitted and the requested advertisement information is received and stored during the stand by mode.

20. The system of claim 19, wherein the request for connection is generated and transmitted and the requested advertisement device is received and stored during a non-peak time on the provider the network.

21. A method for advertising in a mobile communication system comprises:

generating a request for advertisement information;

transmitting the request for advertisement information to an advertisement device, wherein the advertisement device stores a plurality of advertisement information;

receiving requested advertisement information from the advertisement device;

storing the requested advertisement information in a storage device; and presenting selected advertisement information along with notification information indicating an incoming request for connection to a user of a mobile communication device when a request for connection is received by the mobile communication device.

* * * * *